March 13, 1928.
T. E. MURRAY
BRAKE DRUM
Filed March 11, 1924
1,662,585
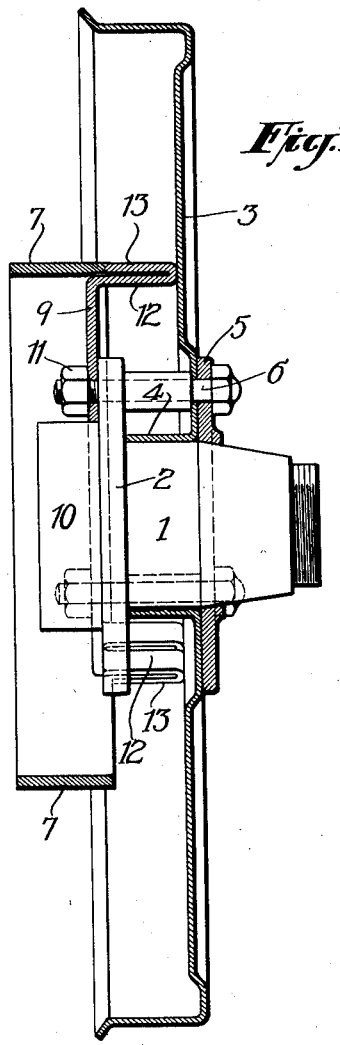
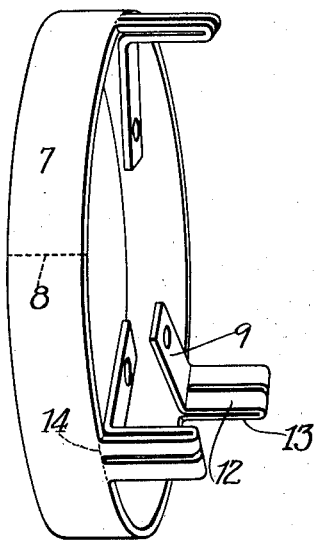
INVENTOR
THOMAS E. MURRAY,
BY
D. Anthony Usina
ATTORNEY Patented Mar. 13, 1928.

1,662,585

UNITED STATES PATENT OFFICE.

THOMAS E. MURRAY, OF BROOKLYN, NEW YORK.

BRAKE DRUM.

Application filed March 11, 1924. Serial No. 698,398.

My invention aims to provide an improvement in drums for the brakes of vehicle wheels whereby considerable economy can be effected. The accompanying drawings illustrate an embodiment of my invention.

Fig. 1 is a section of a wheel, partly in elevation;

Fig. 2 is a perspective view of the brake drum before application.

Referring to the embodiment of the invention illustrated, the hub 1 of the wheel has a circumferential flange 2. A disc 3 has an inner flange 4 fitting on the hub and is fastened by means of a ring 5 and bolts 6.

The brake drum 7 is formed of a simple rectangular strip of sheet metal, bent to drum form with its ends welded together as for example at 8, Fig. 2. Such a strip can be cut without waste from ordinary rectangular sheets and can be bent up and welded very economically. At one edge of the drum 7 there are attached, preferably by butt welding, certain projections by which the drum can be mounted on the hub or other convenient part of the wheel. In the case illustrated three such fastening members are provided. Each comprises a transverse portion 9 extending radially inward, centered on the part 10 of the hub and bearing on the flange 2 of the latter with holes through which the bolts 6 pass, so that the parts may be fastened together by means of the nuts 11. At the outer end of each strip 9 it is bent to form an axial extension 12 to make contact with the disc 3 and then bent back in the opposite axial extension to form the portion 13 the end of which is butt welded to the edge of the drum 7. Preferably the outer end of each of these attachments is split in the radial direction to facilitate welding. The welded joints are indicated in dotted lines at 14, Fig. 2.

The parts 12 and 13, designed to provide an axial extension to a bearing against the disc are not essential. The drum may be designed and located for use with an inside brake or an outside brake or both. The shape of the disc in section and the mode of assemblage of the parts may be considerably varied. In fact, the drum may be applied to all sorts of wheels, not merely to disc wheels.

Though I have described with great particularity of detail a certain embodiment of my invention, yet it is not to be understood therefrom that the invention is restricted to the embodiment disclosed. Various modifications thereof may be made by those skilled in the art without departure from the invention as defined in the following claim.

What I claim is:

The combination with a wheel having a hub with a flange 2, of a brake drum 7 having butt welded to one edge fastening members with portions 9 extending radially inward and fastened against said flange 2.

In witness whereof, I have hereunto signed my name.

THOMAS E. MURRAY.